(12) United States Patent
Gullberg

(10) Patent No.: US 6,560,886 B2
(45) Date of Patent: May 13, 2003

(54) DEVICE FOR ADJUSTMENT OF CUT ANGLE

(76) Inventor: Ulf Gullberg, Vinterhill, SE-540 15, Väring (SE)

( * ) Notice: Subject to any disclaimer, the term of this patent is extended or adjusted under 35 U.S.C. 154(b) by 0 days.

(21) Appl. No.: 09/958,277

(22) PCT Filed: May 4, 2001

(86) PCT No.: PCT/SE00/00866
§ 371 (c)(1),
(2), (4) Date: Oct. 9, 2001

(87) PCT Pub. No.: WO00/67969
PCT Pub. Date: Nov. 16, 2000

(65) Prior Publication Data
US 2002/0157268 A1 Oct. 31, 2002

(30) Foreign Application Priority Data
May 6, 1999 (SE) .................................. 9901635

(51) Int. Cl.[7] ................................................ B43L 7/10
(52) U.S. Cl. ............................... 33/471; 33/1 N; 33/640
(58) Field of Search ........................ 33/1 N, 452, 465, 33/466, 471, 495–500, 534, 640

(56) References Cited

U.S. PATENT DOCUMENTS

| | | | | |
|---|---|---|---|---|
| 310,450 A | * | 1/1885 | Marks | 33/465 |
| 451,659 A | * | 5/1891 | Hatcher | 33/499 |
| 715,897 A | * | 12/1902 | Streed | 33/499 |
| 718,396 A | * | 1/1903 | Smith | 33/498 |
| 1,060,466 A | * | 4/1913 | Leloup | 33/495 |
| 1,655,887 A | * | 1/1928 | Bailey | 33/496 |
| 1,669,258 A | * | 5/1928 | Luoma | 33/495 |
| 6,401,584 B1 | * | 6/2002 | Rowe | 33/452 |

FOREIGN PATENT DOCUMENTS

| | | |
|---|---|---|
| GB | 2 248 505 A | 4/1992 |
| SE | 8200065-4 | 1/1982 |
| SE | 8201898-7 | 11/1987 |
| WO | WO 97/03336 A1 | 1/1997 |

* cited by examiner

*Primary Examiner*—G. Bradley Bennett
(74) *Attorney, Agent, or Firm*—Burns, Doane, Swecker & Mathis, L.L.P.

(57) ABSTRACT

An auxiliary appliance, known as a mitering device, for setting the cutting angle in miter-cutting operations prior to the cutting proper, comprising two arms (1, 2), which are pivotally interconnected by means of a hinge, each one of said arms having at least one orientation face, and an angle-indicating means (4), which is connected to the arm-interconnection hinge via a gear mechanism (5), said gear mechanism being adapted, upon relative pivotal motion of the arms, to transfer essentially half of said pivotal motion to the angle-indicating means relative to the arms.

20 Claims, 2 Drawing Sheets

DEVICE FOR ADJUSTMENT OF CUT ANGLE

FIELD OF INVENTION

The present invention relates to an auxiliary appliance, more precisely to a mitring device, designed to set the cutting angle in mitre-cutting operations and comprising two hingedly interconnected arms, each having at least one orientation face.

BACKGROUND OF THE INVENTION

In mitre-cutting, i.e. cutting of two edge pieces that meet to form a joint at a corner, a so called mitre joint, it is as a rule difficult to determine the (bevel) angle at which the ends of the edge pieces are to be cut. For example, it is often necessary to cut bevels in edgings, profile sections, pipes and the like for adaptation of the angle to bay windows and other recesses, corners to be lined with edgings and so on. In simple cases, for example in the case of right-angle cutting, fixed settings may be used, but in the case of other angles, the task often is a more complicated one. Normally, it is necessary to first measure the angle, thereafter divide it by two and then set the cutting angles in accordance with the angle indexes on a mitre crosscutting saw or similar appliance. All these steps do, however, involve considerable risks that errors occur, errors that in addition reinforce one another.

In order to reduce these sources of error it is further known from the Swedish Patent Specification 8201898-7 to provide a mitre-cutting apparatus comprising two hingedly interconnected arms and saw-guide means detachably fastened to one of the arms. The saw-guide means is arranged to ensure that the saw is guided to move at right angles to the arm on which the guide means is mounted. The two arms are provided with depending guide pins serving as auxiliary means in the sawing operation proper. Additionally, from the Swedish Patent Specification 8200065-4 is known a device for angle measuring and mitre cutting. Essentially, the device comprises two arms or wings, which are hingedly interconnected by means of a sprocket segment to ensure synchronous arm movements. The wings are provided with flanges serving as a support face, on which rest the articles to be severed or mitre-cut. In addition, the device comprises guide means to guide the tools used for the sawing operation.

Each one of these prior-art devices is however intended to measure a mitre-joint angle and to perform sawing at this angle. In consequence hereof, the devices are restricted to use with manual sawing tools. In addition, the mitring device is connected with the saw-guide means, making the devices expensive and complicated to manufacture. Also, in practice they have proved inconvenient to use.

Consequently, there is a need for a mitring device, which is simple and inexpensive both to manufacture and to use and which at the same time eliminates or at least reduces both reading and setting errors. In addition, it is desirable to be able to use the mitring device together with several different kinds of cutting tools.

OBJECT OF THE INVENTION

One object of the present invention thus is to provide an auxiliary appliance, known as a mitring device, to set the cutting angle in mitre-cutting operations, by means of which the above drawbacks found in prior-art devices are completely or at least partly eliminated.

This object is achieved by means of a mitring device as defined in the appended claims.

SUMMARY OF THE INVENTION

The mitring device in accordance with the invention comprises two arms, which are pivotally interconnected by means of a hinge, each one of said arms having at least one orientation face, and an angle-indicating means, which is connected to the arm-interconnecting hinge via a gear mechanism, the latter being adapted, upon relative turning motion of the arms, to turn the angle-indicating means relative to the arms over a distance that essentially corresponds to half said arm-turning motion.

In this manner a simple construction is obtained, that is uncomplicated to use and in addition is inexpensive to manufacture owing to the small number of components involved. In use, the mitring device is positioned in the place where the mitre-cutting operation is to be performed and the orientation faces on the arms are set accordingly. The mitring device, still with the arms in the set position, is placed in such a manner that one of the orientation faces instead extends in alignment with the edge of the object to be cut, whereupon the cutting tool is orientated as indicated by the angle-indicating means. The operation is wholly visual, thus obviating the need for numeric angle readings, calculations and so on. Once the cutting tool is set and preferably immobilised in the set position, the mitring device is removed and the cutting operation may be performed.

The gear mechanism of the mitring device in accordance with the invention further preferably comprises a first toothed member, which is stationarily arranged on a first one of the arms, and a second toothed member, which is movably arranged on the second one of said arms and meshes with the first toothed member, the angle-indicating means being securely joined to the second toothed member. In addition, the toothed members preferably consist of gear wheels, the second, movable gear wheel comprising twice as many teeth as the first, stationary gear wheel.

BRIEF DESCRIPTION OF THE DRAWINGS

The invention will be described in the following in more detail by means of one embodiment thereof and with reference to the accompanying drawings, wherein.

DESCRIPTION OF PREFERRED EMBODIMENTS

Figure 1:
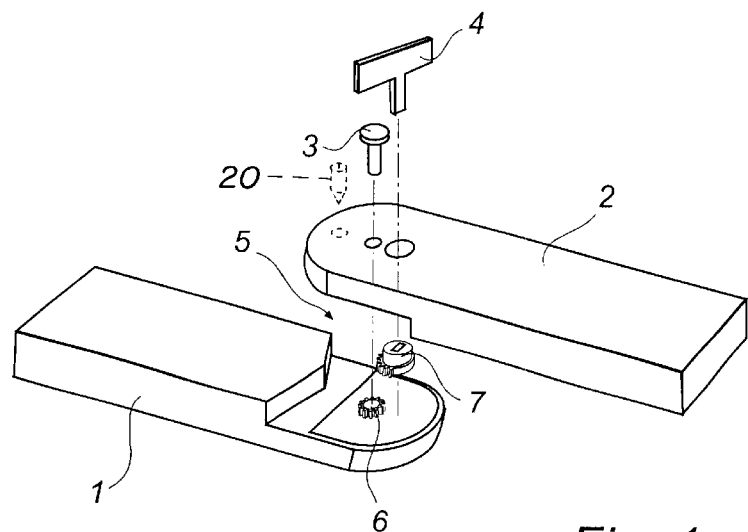
FIG. 1 is an exploded view of a mitring device in accordance with a preferred embodiment of the invention.
Figure 2:
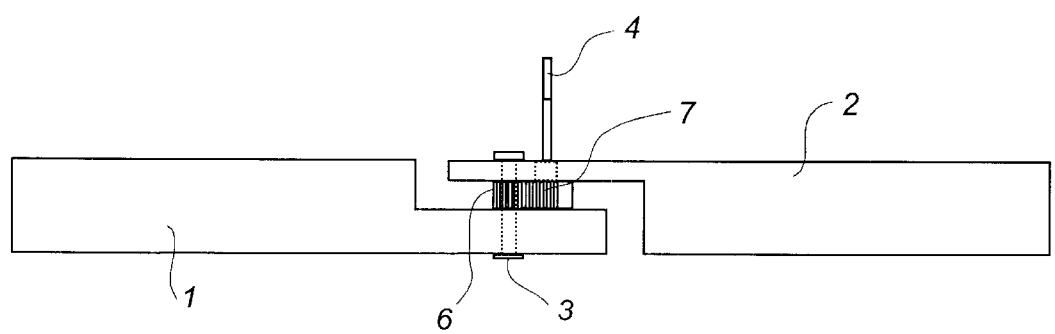
FIG. 2 is a lateral view of the mitring device of FIG. 1.
Figure 3:
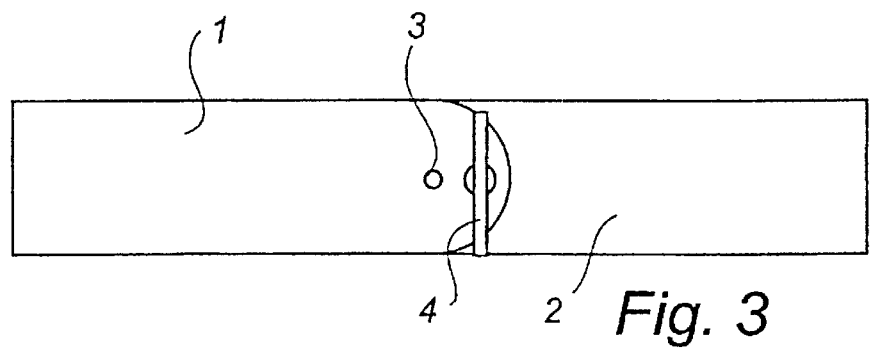
FIG. 3 is a view from above of the mitring device of FIG. 1.

The invention concerns an auxiliary appliance, known as a mitring device, designed to set the angle to be cut in mitre-cutting operations before the actual cutting takes place. As shown in FIGS. 1–3, the mitring device in accordance with the is invention comprises two arms 1, 2. The arms are pivotally interconnected by means of a hinge. Preferably, the arms are arranged to overlap in their pivotal plane, and in the area of overlapping they are interconnected by means of a hinge comprising a pivot pin 3, which is secured to the arms and about which the arm turning motion is effected. Other ways of providing pivotal interconnection of the arms are, however, possible.

In addition, the arms are formed with at least one orientation face each, said faces extending at right angles to the pivotal plane. Advantageously, the arms are equipped with two orientation faces each, which are parallel with one another. The purpose of the orientation faces is that they be positioned in abutment against the faces on which the mitre is to be placed.

The mitring device also comprises an angle-indicating means 4, which is connected to the hinge between the arms via a gear mechanism 5. Upon turning motion of the arms relative to one another, the gear mechanism is arranged to transmit to the angle-indicating means 4 essentially half of said turning motion relative to the arms. Preferably, the angle-indicating means is set in a direction essentially in parallel with the bisector of the angle between the arm orientation faces.

In accordance with a preferred embodiment, the gear comprises a first part 6, which is stationarily mounted on one of the arms, and a second part 7, which is movably mounted on the other arm and which meshes with the first part, while the angle-indicating means is securely joined to the second part. These gear parts preferably are toothed elements, such as gear wheels or the like. In accordance with the embodiment shown, the first, stationary gear wheel 6 is mounted on the first arm 1. The second, mobile gear wheel 7 is rotationally mounted on the second arm 2 and is supported on the first arm for displacement thereon while meshing with the first, stationary gear wheel 6. In this manner, the second gear wheel 7 is able to move in an orbit around the stationary gear wheel 6, when the second arm 2 is turned relative to the first arm 1. To achieve the desired gear ratio, the second, movable gear wheel 7 comprises twice as many teeth as the first, stationary gear wheel 6 in order to provide the desired gear ratio for turning the angle-indicating means upon pivotal motion of the arms. As an alternative, the gear wheels need not be formed with teeth over their entire external face but only on the areas thereof that are within meshing reach of the second wheel within the predetermined pivotal range of the arms. Also according to this alternative, the number of teeth per circumferential unit on the movable wheel must be double that on the stationary wheel. Other ways of arranging the gear are possible, such as the arrangement of two wheels, made from a high-friction material, in engagement with one another. In this case, the circumference of the mobile wheel should be twice that of the stationary wheel in order to achieve the same gear ratio. Also other varieties of gears and gear ratios are possible to use within the scope of the present invention.

Advantageously, the mitring device also comprises some kind of locking means to immobilise the arms in the desired relative position. Alternatively, relative arm motions may be prevented by means of friction of sufficient magnitude to make additional locking arrangements superfluous. The locking means could be a locking screw 20 or the like.

Figure 4:
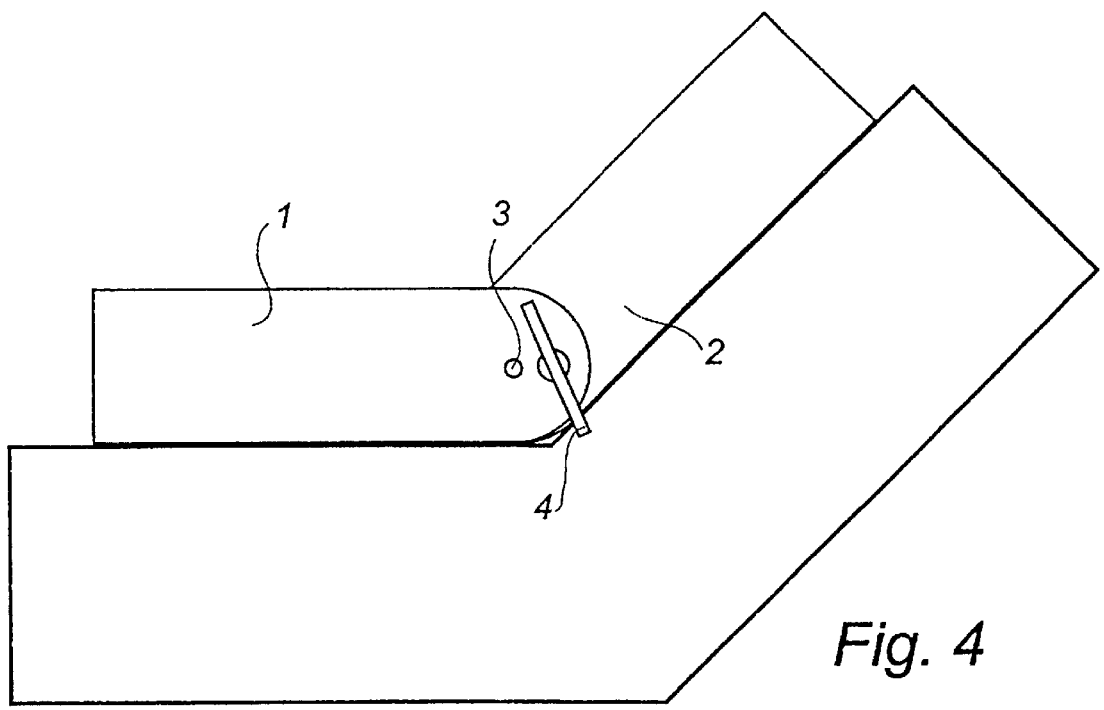
FIG. 4 illustrates setting of the mitring device of FIG. 1 at an angle.
Figure 5:
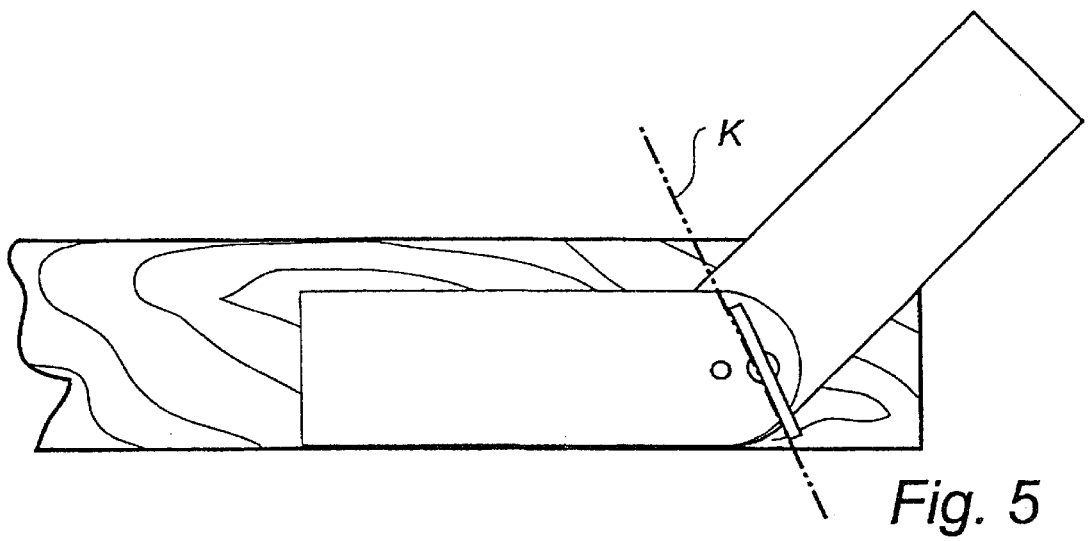
FIG. 5 illustrates the orientation of a cutting angle based on the angle at which the mitring device of FIG. 4 is set.

In use, the orientation faces of the arms of the mitring device are initially positioned in abutment against the angular object to be bevel-cut, as shown in FIG. 4. Once the angle of the object is set, the arms are locked in the set position, if necessary, and the mitring device, while maintaining the set angle between the arms, is then transferred to the saw or cutting device to be used. For this purpose, one of the orientation faces is placed in the corresponding position on the object to be cut, such as a plank or the like, with the angle-indicating means clearing showing the desired cutting direction K, as shown in FIG. 5. The saw blade or equivalent means of the severing tool may thereafter easily be set by visually alignment of the tool cutting direction with the direction indicated by the angle-indicating means. The mitring device is then removed, and the object may be cut in the desired (angular?) direction. In this way the steps of first reading the set angle on the mitring device and thereafter setting the corresponding angle on the mitre crosscutting saw are eliminated as consequently are the sources of error that are inherent in these two steps.

The mitring device in accordance with the invention likewise concerns a device for setting only of the angle to be bevel-cut, in which case the angle-indicating means serves only as an indicator to visually show the orientation of a cutting tool. This makes the novel mitring device easy to use while at the same time it is a high-precision appliance that also eliminates reading errors and similar faults. In addition, it is simple and inexpensive to manufacture, particularly as the mitring device in accordance with the invention is not significantly subjected to loads while in use.

The mitring device in accordance with the invention is useful to measure right angles as well as acute or obtuse angles.

The invention has been described herein by means of one embodiment. It should be appreciated, however, that many varieties of the invention are possible. For example, it is possible to design the gear mechanism in many different ways, to arrange the arm-interconnecting hinge differently, and so on. Such and other obvious modifications should be considered to be within the scope of protection of the invention as the latter is defined in the appended claims.

What is claimed is:

1. An auxiliary appliance for setting a cutting angle in mitre-cutting operations prior to cutting, comprising:
   two arms, the arms being pivotally interconnected by a hinge, each one of the arms having at least one orientation face, and
   an angle indicator connected to the hinge via a gear mechanism, the gear mechanism being adapted, upon relative pivotal motion of the arms, to pivot the angle indicator through an angle half as big as an angle of pivotal motion of the arms,
   wherein the gear mechanism comprises a first part that is stationarily arranged on a first one of the arms, and a second part that is movably arranged on a second one of the arms and meshes with the first part, the angle indicator being joined to the second part and extending in a plane essentially perpendicular to a pivotal plane of the arms.

2. An auxiliary appliance as claimed in claim 1, wherein the gear mechanism is adapted to set the angle indicator in a direction essentially in parallel with a bisector of an angle between the orientation faces of the arms.

3. An auxiliary appliance as claimed in claim 1, wherein the arms are arranged to overlap in a pivotal plane and are interconnected in an overlapping area by a pivot that is secured to the arms and around which the pivotal motion takes place.

4. An auxiliary appliance as claimed in claim 1, wherein the arms are formed with two orientation faces each, the faces being parallel with one another.

5. An auxiliary appliance as claimed in claim 1, wherein the first and second gear mechanism parts comprise toothed members.

6. An auxiliary appliance as claimed in claim 5, wherein the toothed members comprise gear wheels and the second gear mechanism part comprises a movable gear wheel having twice as many teeth as a stationary gear wheel of the first gear mechanism part.

7. An auxiliary appliance as claimed in claim 1, further comprising a lock to lock the arms relative to each other.

8. An auxiliary appliance as claimed in claim 2, wherein the arms are arranged to overlap in a pivotal plane and are interconnected in an overlapping area by a pivot that is secured to the arms and around which the pivotal motion takes place.

9. An auxiliary appliance as claimed in claim 2, wherein the arms are formed with two orientation faces each, the faces being parallel with one another.

10. An auxiliary appliance as claimed in claim 3, wherein the arms are formed with two orientation faces each, the faces being parallel with one another.

11. An auxiliary appliance as claimed in claim 8, wherein the arms are formed with two orientation faces each, the faces being parallel with one another.

12. An auxiliary appliance as claimed in claim 2, wherein the first and second gear mechanism parts comprise toothed members.

13. An auxiliary appliance as claimed in claim 3, wherein the first and second gear mechanism parts comprise toothed members.

14. An auxiliary appliance as claimed in claim 4, wherein the first and second gear mechanism parts comprise toothed members.

15. An auxiliary appliance as claimed in claim 8, wherein the first and second gear mechanism parts comprise toothed members.

16. An auxiliary appliance as claimed in claim 9, wherein the first and second gear mechanism parts comprise toothed members.

17. An auxiliary appliance as claimed in claim 12, wherein the toothed members comprise gear wheels and the second gear mechanism part comprises a movable gear wheel having twice as many teeth as a stationary gear wheel of the first gear mechanism part.

18. An auxiliary appliance as claimed in claim 2, further comprising a lock to lock the arms relative to each other.

19. An auxiliary appliance as claimed in claim 2, further comprising a lock to lock the arms relative to each other.

20. An auxiliary appliance as claimed in claim 8, further comprising a lock to lock the arms relative to each other.

* * * * *